K. P. NICKELL.
DITCHING PLOW.
APPLICATION FILED FEB. 5, 1910.
973,689.
Patented Oct. 25, 1910.
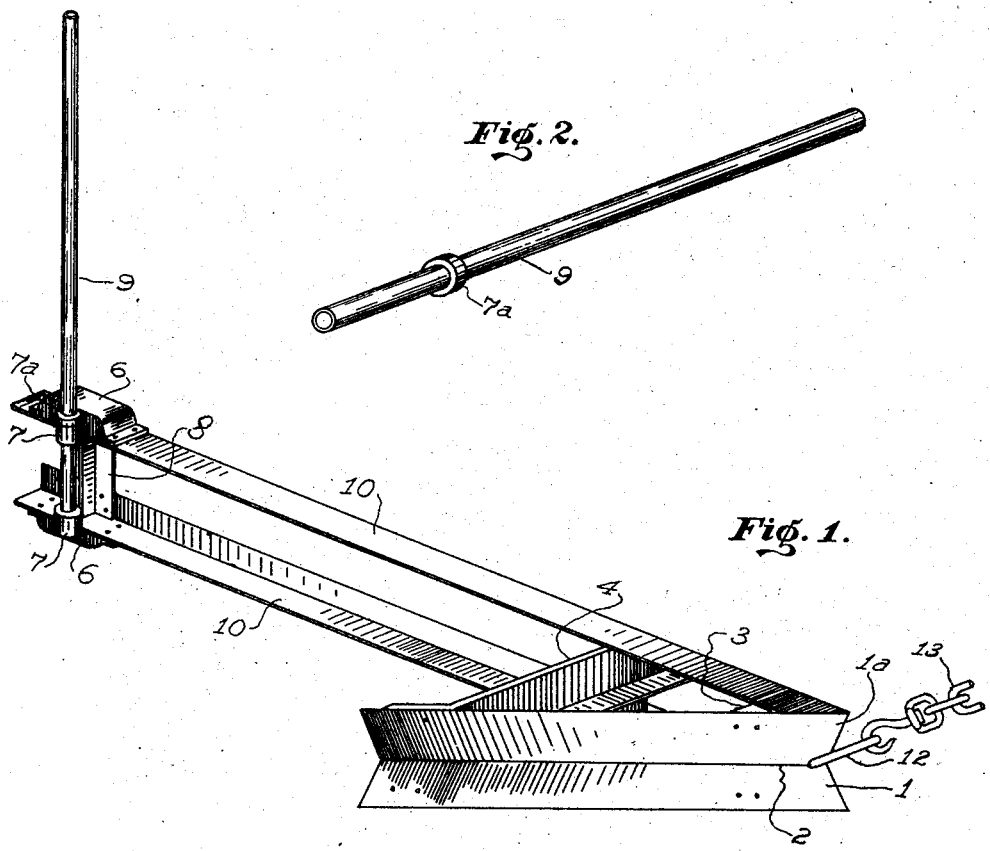

UNITED STATES PATENT OFFICE.

KELS P. NICKELL, OF SARATOGA, WYOMING.

DITCHING-PLOW.

973,689.  Specification of Letters Patent.  Patented Oct. 25, 1910.

Application filed February 5, 1910. Serial No. 542,353.

*To all whom it may concern:*

Be it known that I, KELS P. NICKELL, a citizen of the United States, residing at Saratoga, in the county of Carbon and State of Wyoming, have invented certain new and useful Improvements in Ditching-Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in ditching plows, in which the parts forming the same are reversible, or when desired by the operator, can be turned bottom side uppermost, thereby casting the excavated earth either to the right or left; the intention of my said invention being that it works equally well in either position.

The objects of my improvement are: first, to provide a ditching plow that will be easily constructed and at a very small cost, and second, to provide such a device that is useful when operated with either side uppermost, so that the earth may be thrown from a ditch to either side of the ditch, as may be desired. I attain these objects by the mechanisms illustrated in the accompanying drawings, in which—

Figure 1 is a perspective view of my invention with all parts in place, ready to be attached to a team or other motive power, for use in excavating a ditch, and Fig. 2 is a perspective view of the lever used for reversing the position of the ditching machine.

Similar numbers refer to similar parts in the views.

The plow share or mold-board is made of a steel plate, bent in such a way as to form a trough-like share, the lower part 1 being just like the upper part —1ª— each being bent outwardly from the center line 2— in such manner that the relative position of each to the ground is the same when in position for work as shown in 1— except when reversed from that position—the lower side uppermost—the earth will be thrown in an opposite direction as the plow proceeds with its work.

The plow share is secured to suitable castings 3 and 4, which are firmly attached to two angle bars in such manner that the share is at an angle from said angle bars, with their ends meeting at a common point, forming a sharp cutter which separates the earth as the plow is drawn forward.

The angle bars are secured at their rear ends to a casting 8, containing circular openings at 7, through which the lever 9 may pass, and also has the runner 6 which is designed to raise the angle bars, so as to cause the point of the share to properly enter the ground, when the plow will work successfully without further adjustment.

The link 12 and chain 13 are adjustable so as to be of suitable length to guide the plow properly into the earth, and when in its proper place no other adjustment is required for successful work.

The lever 9 is composed of gas pipe or round iron bar, on which is securely attached collar 7ª, which prevents the lever from passing too far into openings 7 of casting 8.

To turn or reverse the plow as shown in Fig. 1, bottomside uppermost, lever 9 is pressed downwardly until angle bars rest on the ground, whereupon the lever is removed, replaced in the opposite direction in openings 7, raised upwardly until perpendicular and the plow is reversed, in a position opposite to that shown in Fig. 1, but will be in just the same relative position with the ground, and the earth will be cast in the opposite direction.

What I claim is:

1. A plow comprising castings, angle bars attached to said castings and a share of substantially trough-like outline and standing at an angle to said angle bars with their ends meeting at a common point.

2. A plow comprising castings, angle bars attached to said plate castings, a share of substantially trough-like outline and standing at an angle to said angle bars with their ends meeting at a common point, and a handle applied to said angle bars at a distant point to said share, said angle bars being provided upon their upper and lower surfaces with raised members.

In testimony whereof, I affix my signature, in presence of two witnesses.

KELS P. NICKELL.

Witnesses:
T. J. HURDLE,
FRANK A. HILES.